United States Patent [19]

Bock

[11] Patent Number: 4,982,236
[45] Date of Patent: Jan. 1, 1991

[54] SELF SUPPORTING OPTICAL DOCUMENT SCANNING SYSTEM

[75] Inventor: Edward C. Bock, Webster, N.Y.
[73] Assignee: Xerox Corporation, Stamford, Conn.
[21] Appl. No.: 491,766
[22] Filed: Mar. 12, 1990
[51] Int. Cl.$^5$ ............................................. G03G 15/28
[52] U.S. Cl. ..................................... 355/235; 355/67; 355/233; 358/497
[58] Field of Search ................... 355/233, 235, 51, 67; 350/6, 5; 358/497

[56] References Cited

U.S. PATENT DOCUMENTS

| | | | |
|---|---|---|---|
| 4,155,641 | 5/1979 | Sagara et al. | 355/235 |
| 4,332,460 | 6/1982 | Costanza | 355/235 X |
| 4,367,945 | 1/1983 | Abe | 355/235 X |
| 4,371,254 | 2/1983 | Beery | 355/235 |
| 4,386,842 | 6/1983 | Beery | 355/235 |
| 4,500,197 | 2/1985 | Dannatt | 355/235 |
| 4,603,963 | 8/1986 | Hinton et al. | 355/235 |
| 4,710,017 | 12/1987 | Watanabe et al. | 355/235 |

*Primary Examiner*—A. T. Grimley
*Assistant Examiner*—J. E. Barlow, Jr.

[57] ABSTRACT

A document scanning system is disclosed which utilizes a scan carriage mounted on guide rails which are connected between novel support members. The support members are mounted at one location only to a fixed base support. The guide rails do not require mounting to a side frame structure; the support structure providing the stability usually provided by the sides of a frame. The guide rails are inherently stable and provide the support for the scan load components. The second embodiment of the invention uses a single guide rail to support the optical system rather than plural guide rails.

3 Claims, 5 Drawing Sheets

SELF SUPPORTING OPTICAL DOCUMENT SCANNING SYSTEM

BACKGROUND AND PRIOR ART STATEMENT

This invention relates to an optical document scanning system for a document reproduction machine and, more particularly, to an improved assembly for supporting the optical components used during the document scan operation.

In the document reproduction art, an original document to be reproduced is typically placed on a stationary platen and illuminated by a incremental line-scanning optical system. Reflected light rays from the document travel along an optical path and are projected by a lens on to a photosensitive image member. The latent image of the document formed on the image member is then developed by appropriate marking material, and the developed image transferred to a record medium such as paper. Various types of scan mechanisms are known in the art, but the most widely used utilize a pair of guide rails which are mounted in a parallel plane beneath the document platen. The scanning components are mounted on one or more movable scan carriages which are driven by a cable arrangement to run back and forth beneath the platen and supported by the guide rails. Examples of such prior art scan systems employing an elongated illuminated lamp and scan mirrors to scan/illuminate the document are shown in U.S. Pat. Nos. 4,367,945, 4,155,641 and 4,603,963. The document to be reproduced may also be scanned by a raster input scanner (RIS), typically a CCD sensor array. The RIS type scanner is supported for movement beneath the document platen and is moved in the scan, re-scan direction by a scan assembly basically similar to the ones used in the above-identified patents. U.S. Pat. No. 4,500,197 discloses a RIS type scan system. The prior art scanning system can be characterized as being secured to, and supported by, the sides of a frame assembly. Thus, U.S. Pat. No. 4,367,945 to Abe discloses a scanning support structure for an electrostatic copying machine comprising a guide rail 22 and a guide rod 23 which together support and absorb the loads of two movable carriages 12 and 14, while being supported by frame members 20 and 21. U.S. Pat. No. 4,155,641 to Sagara et al. discloses a scanning apparatus comprising three parallel guide rods 52, 53, and 54, attached to a beam member 20, which support the loads imposed by two movable optical scanning carriages 50 and 51. U.S. Pat. Nos. 4,603,963 to Hinton et al., and 4,710,017 to Watanabe et al. are references which disclose scanning systems comprising a pair of frame supported parallel guiding members which absorb the shock and loads of a moving carriage apparatus within an electrostatic copying machine. U.S. Pat. No. 4,500,197 to Dannatt discloses a support structure for a flat bed scanner comprising a pair of parallel, elongated guide rods 55 and 62 fixed to left and right end plates 14 and 16, which form rigid support for the loads imposed by a movable RIS optical scanning carriage assembly 12.

SUMMARY OF THE INVENTION

In each of the above-prior art systems, which are representative of the known scan systems, the scan components mounted on the guide rails require integral connection to a formal frame structure with the frame structure providing the support for the mass of the guide rails and optical scan components. The requirement for a frame structure increases the cost of the scan system, while the mounting interconnection between the scan components and the frame sides increases the system complexity. According to one aspect of the present invention, a scan assembly is mounted in a frameless environment by making efficient use of the inherent stiffness of the guide rails to support the scanning components. More particularly, the guide rails are mounted with an assembly which is secured to a base support. Cable tension and the scan load components are located at the center line of the guide shafts, the guide shafts now providing all the needed support formerly supplied by the side walls of the frame member. Still more particularly, the invention relates to an imaging system for incrementally illuminating a document in an object plane and transmitting reflected incremental images to a photosensitive image member, an illumination/scan system comprising; a scan carriage movable in a reciprocal path along at least one guide rail which extends in a plane beneath and parallel to said object plane, at least one support structure for supporting said carriage, said support structure extending between the start and end of scan positions, said support structure further including a capstan assembly rotatingly driven by a drive shaft, and further including a drive cable wrapped around said capstan assembly and connected at the other end of said carriage, the scan carriage being driven along said reciprocal path by said drive cable and wherein said capstan assembly and cable are located along the center line of said guide rails, the guide rails providing the support for the scanning components.

IN THE DRAWINGS

DESCRIPTION OF THE PREFERRED EMBODIMENT

Figure 1:
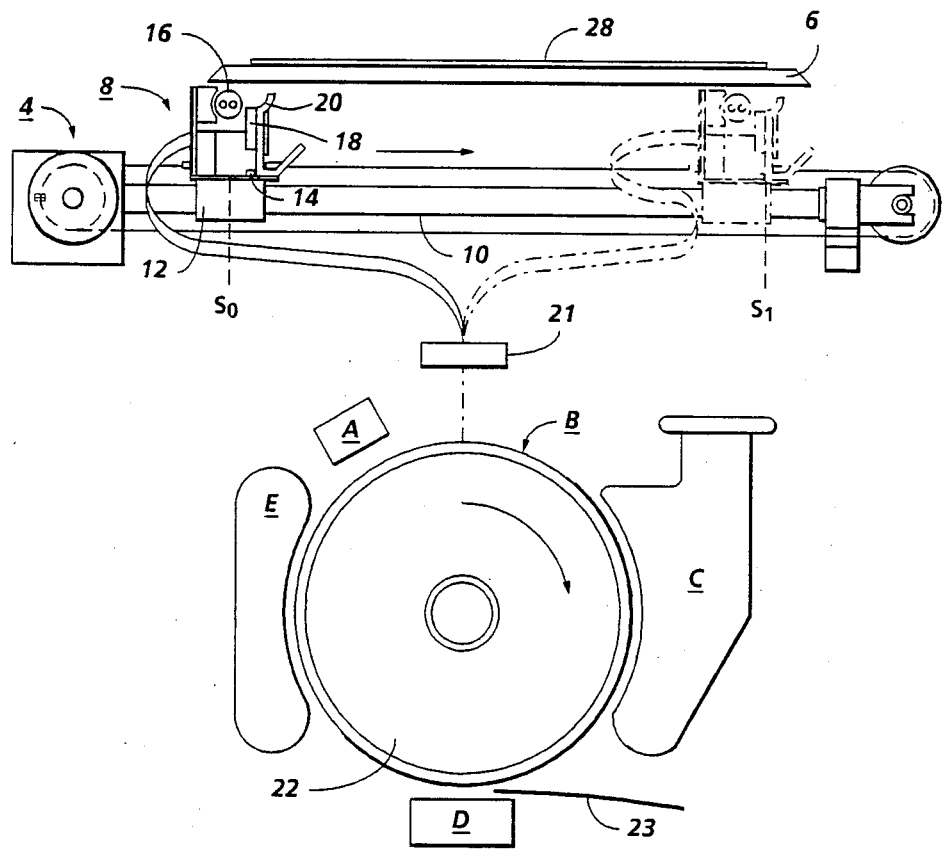
FIG. 1 is a schematic side view of a document reproduction system utilizing the RIS type scanner mechanism support structure of the present invention.
Figure 2:
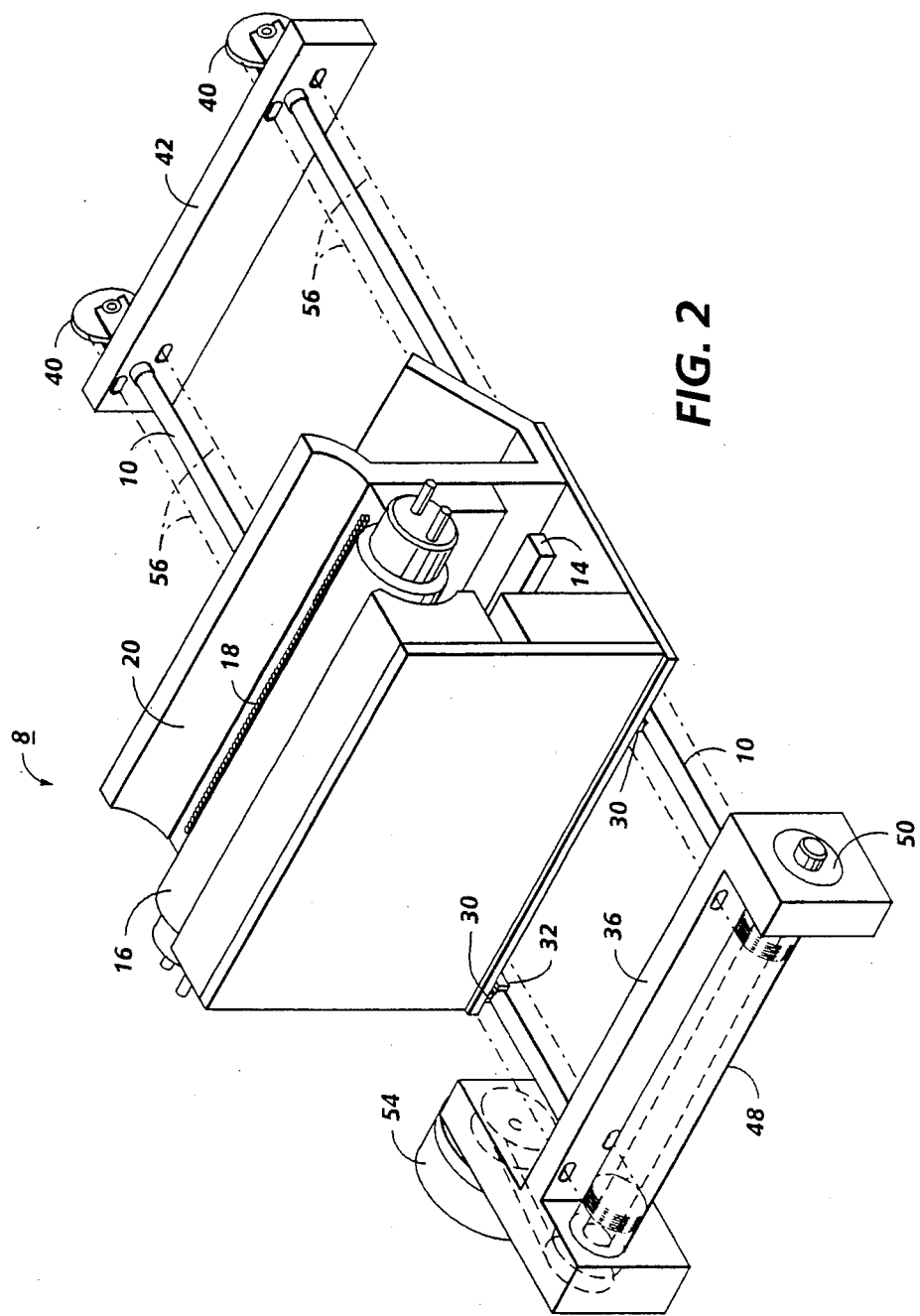
FIG. 2 is a perspective view of the optical scanning mechanism of FIG. 1.

Referring now to FIG. 1, raster input scanner assembly is located beneath a document platen 6. Assembly 4 includes a scanning array carriage 8 supported for reciprocating scanning movement by two support rails 10 (FIG. 2). Rails 10 extend parallel to the platen and are located between support structures described below. Scanning array carriage 8 is supported on support member 12 which is movingly mounted on rails 10 by bearings or bushings at the frictional interface. Photosensor array 14, which may be a linear array of photosensitive scanners such as CCD's or photodiodes which sense light reflected from a document during an integration period, is supported on member 12. The photosensors develop a charge indicative of the amount of light detected. In a preferred embodiment of the invention, the array may comprise several smaller arrays butted at their ends to form an unbroken array as, for example, the arrays described in U.S. Pat. No. 4,604,161 to Araghi.

A document 28, placed on platen 6, is illuminated by a lamp assembly supported on member 12 and including lamp 16. The lamp, when energized by a power supply (not shown), directs light towards the document to be scanned. Light from the illuminated document is reflected to lens 18, comprising a bundle of image transmitting fiber lenses produced under the tradename of "SELFOC" by Nippon Sheet Glass Company Limited. Lens 18 directs light reflected from the document to scanning array 14. Adjacent to the portion of lens 18 closest to the document is a reflector 20, extending generally towards the document which may be advantageously provided with a light reflecting concave surface to further aid in directing light from lamp 16 to illuminate the document. It will, of course, be appreciated that other optical and illuminating systems may be used to illuminate and direct light from the document to the scanning array. In a conventional copying operation, assembly 8 is driven from position $S_0$ to position $S_1$. As the scanning assembly is moved across the platen, the sensors of the sensor array 14, are repeatedly exposed to incremental areas of the document being copied, producing charge information indicative of the image on the document for use in assimilating an electronically stored image of the document. Electrical output signals from array 14 are used to control the operation of a raster output scanner (ROS) unit 21. ROS 21 forms a modulated image light pattern on the charged surface of a photoreceptor drum 22 at exposure station B. As a result of this imaging operation the charge on the drum surface is selectively dissipated in the light exposed regions, thereby recording the original input scene information on the photoconductive plate surface in the form of a latent electrostatic image. Next, in the direction of drum rotation, the image bearing plate surface is transported through a development station C wherein the toner material is applied to the charged surface thereby rendering the latent electrostatic image visible. The now developed image is brought into contact with a support sheet 23 such as paper or the like, within a transfer station D wherein the toner image is electrostatically attracted from the photoconductive plate surface to the contacting side of the support sheet. Station E represents a mechanism for cleaning toner from the drum surface. station A recharges the surface of drum 22. Control of the RIS and ROS operation the various xerographic stations is accomplished by an on-board microprocessor controller (not shown) of the type commonly used to control light lens and raster scanners.

Figure 3:
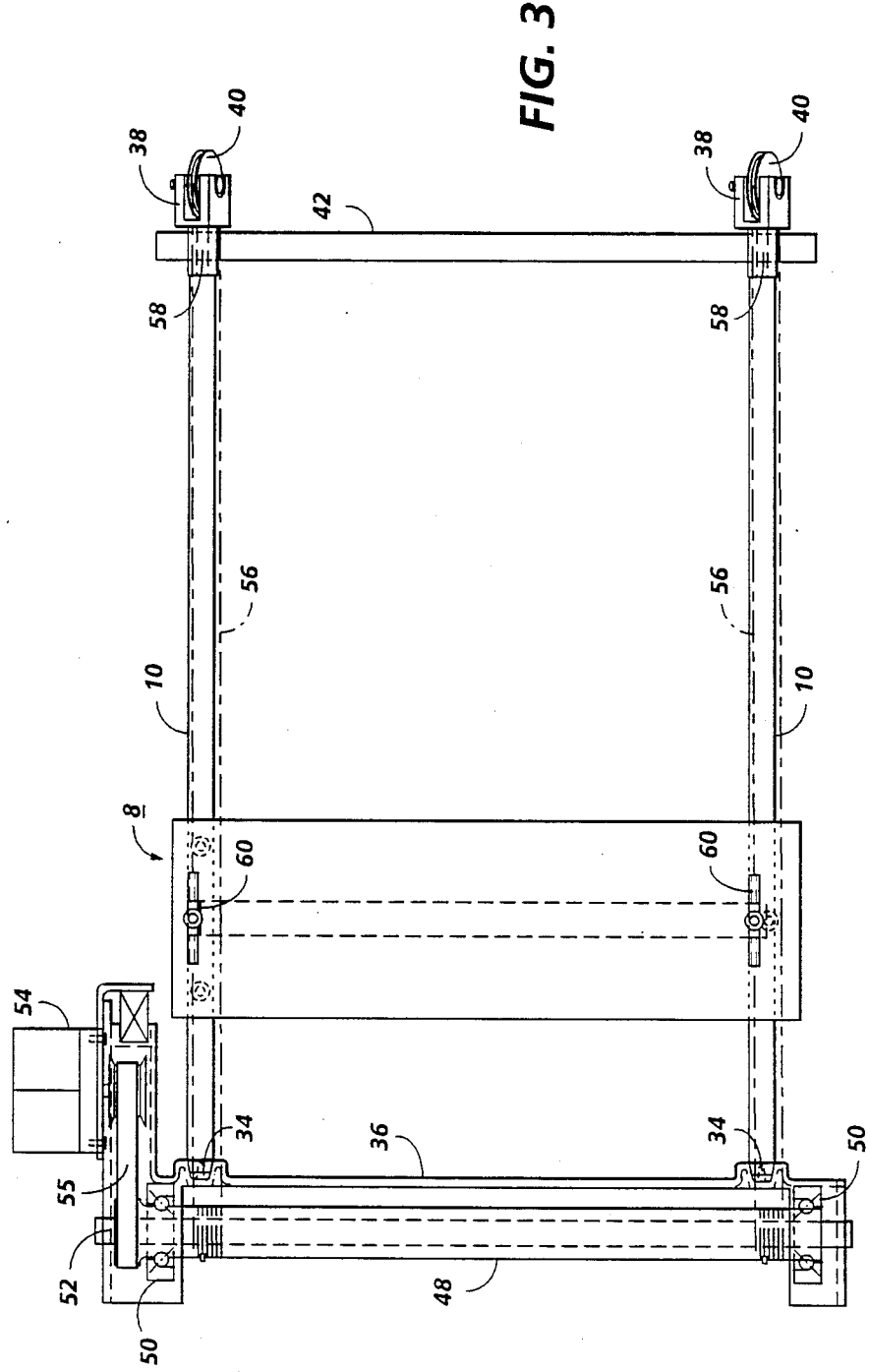
FIG. 3 is a top plan view of the scanning mechanism of the optical scanning mechanism of FIG. 1.
Figure 4:
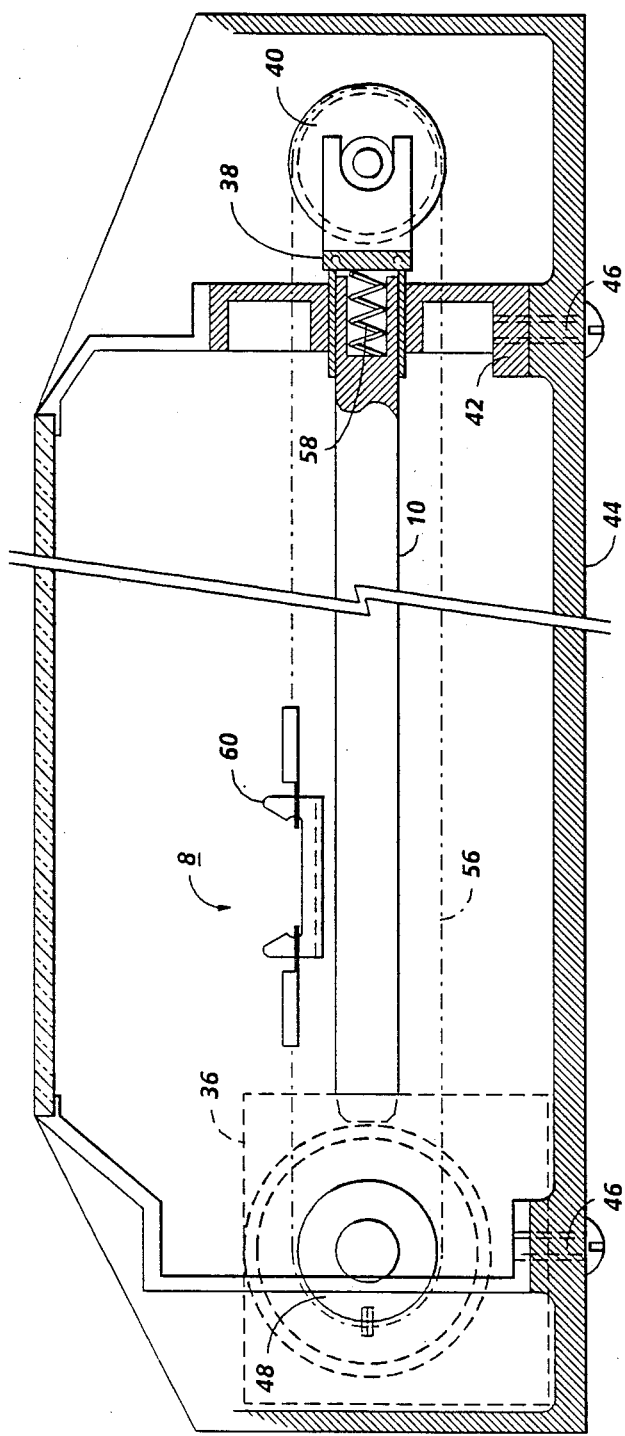
FIG. 4 is a side plan view of the optical scanning mechanism of FIG. 1.

The optical system will now be described with further detail and with additional reference to FIGS. 2-4. In the base mode of operation, the copier is operated to faithfully produce a copy of a document 28 which is placed image side down upon a platen 6. This is accomplished by scan carriage 8 moving in a scan path parallel to the platen. The carriage 8 is adapted to ride on scan rails 10 along teflon pads 30, 32 which slidingly contact the rails along the top and side surfaces, respectively. One end of each rail 10 is located in bores 34 formed at the ends of support structure 36. The other ends of rail 10 are located in yokes 38. The yokes also support idler pulleys 40. A support 42 mounted to a base plate 44 by screws 46 serves to clamp the yoke and idler pulley into position. Support structure 36 is secured to a base plate 44 in similar fashion. Structure 36, supports a capstan pulley member 48. Pulley 48 terminates at the non-drive end in a bearing assembly 50. The other drive end terminates in an end shaft 52 which is driven by motor 54 via a timing belt 55. Wrapped around the ends of capstan pulley 48 are drive cables 56. Each drive cable is adapted to be aligned along the center of their respective rails 10. Springs 58 apply tension to cables 56. One end of cables 56 are wrapped around capstan pulley 48 and driven therearound while the other end terminates in bracket 60 secured to the drive carriage. In operation, the drive motor 54, in response to copy signals, drives capstan pulley 48 which in turn drive cables 56 causing carriage 8 to move in a left-to-right (scan) and right-to-left (rescan) direction. The CCD array 18 scans reflected light from document 28, and generates electrical signals which are periodically transferred to ROS 21. ROS 21 is thus activated to selectively expose the surface of drum 22 forming the latent image thereon. According to the principle of the present invention, and as described above, the support structure 36 is secured solely to a base plate 44 with the guide rails firmly secured at both ends. The drive cables are mounted along the guide rail center line, hence the cable tension, the scan loads of the scan carriage, and the idler pulley are all located along the guide shaft center line. The inherent stiffness of each guide rail is thus utilized to absorb the loads of the system relieving the necessity of obtaining support from the vertical frame member/platen as in the prior art.

Figure 5:
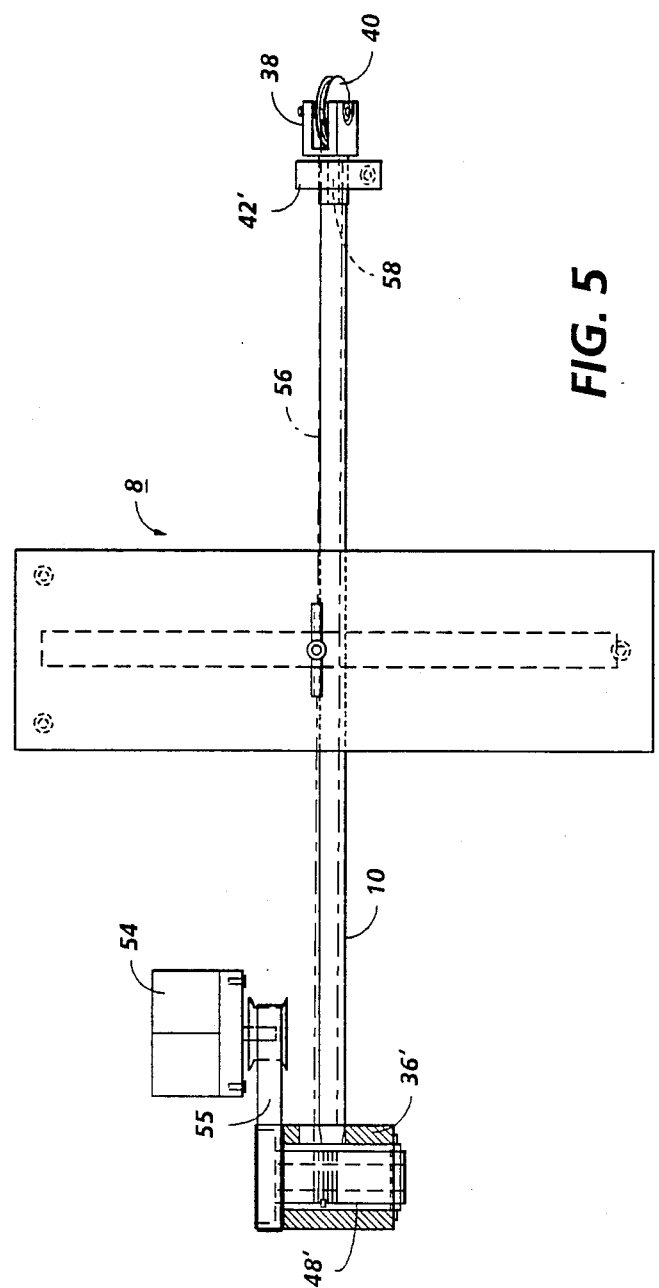
FIG. 5 is a top plan view of a second embodiment of an optical scanning system of the present invention utilizing only one scan support structure.

A second embodiment of the invention is shown in FIG. 5. In this embodiment, carriage 8 is centrally located over a single guide rail 10. Capstan pulley assembly 48' is housed in truncated frame structure 36'. The locating of cable 56 and the securing of structures 36' and 42' correspond to their longer counterpart shown in FIGS. 2-4.

While the invention has been described with reference to the structure disclosed, it will be appreciated that numerous changes and modifications are likely to occur to those skilled in the art, and it is intended to cover all changes and modifications which fall within the true spirit and scope of the invention.

I claim:

1. In an imaging system for incrementally illuminating a document in an object plane and transmitting reflected incremental images to a photosensitive image member, an illumination/scan system comprising;

a scan carriage movable in a reciprocal path along at least one guide rail which extends in a plane beneath and parallel to said object plane, said guide rail secured at its ends to a first and second support structure, said first support structure locating a capstan pulley, and said second support structure locating a yoke and idler pulley assembly, and further including a drive cable wrapped around said capstan assembly and said idler pulley and connected at the other end to said carriage, means for rotating the capstan pulley whereby the scan carriage is driven along said reciprocal path by said drive cable and wherein said capstan assembly, idler pulley assembly and cable are located along the center line of said guide rails, the guide rails providing the support for the scanning components.

2. The imaging system of claim 1, wherein said imaging system includes means for incrementally illuminating said document and for transmitting reflected light to a linear photosensor array.

3. The imaging system of claim 2, wherein the scan carriage is a RIS carriage mounted along a single guide rail.

* * * * *